US011655959B2

(12) United States Patent
Merriam

(10) Patent No.: US 11,655,959 B2
(45) Date of Patent: *May 23, 2023

(54) OPTICAL STRUCTURES FOR LIGHT EMITTING DIODES (LEDS)

(71) Applicant: Eaton Intelligent Power Limited, Dublin (IE)

(72) Inventor: Virginia Merriam, Clay, NY (US)

(73) Assignee: Eaton Intelligent Power Limited

( * ) Notice: Subject to any disclaimer, the term of this patent is extended or adjusted under 35 U.S.C. 154(b) by 0 days.

This patent is subject to a terminal disclaimer.

(21) Appl. No.: 17/560,650

(22) Filed: Dec. 23, 2021

(65) Prior Publication Data

US 2022/0113005 A1 Apr. 14, 2022

Related U.S. Application Data

(63) Continuation of application No. 16/748,443, filed on Jan. 21, 2020, now Pat. No. 11,236,887.

(Continued)

(51) Int. Cl.
*F21V 5/04* (2006.01)
*F21V 7/00* (2006.01)
*F21V 13/04* (2006.01)
*G02B 27/09* (2006.01)
*F21Y 115/10* (2016.01)

(52) U.S. Cl.
CPC ............ *F21V 5/045* (2013.01); *F21V 7/0091* (2013.01); *F21V 13/04* (2013.01); *G02B 27/0916* (2013.01); *G02B 27/0927* (2013.01); *G02B 27/0955* (2013.01); *F21Y 2115/10* (2016.08)

(58) Field of Classification Search
CPC ........ F21V 5/045; F21V 7/0091; F21V 13/04; G02B 27/0916; G02B 27/0927; G02B 27/0955; G02B 19/0028
See application file for complete search history.

(56) References Cited

U.S. PATENT DOCUMENTS

D27,336 S 7/1897 Ewen
5,710,671 A 1/1998 Bichlmaier
(Continued)

FOREIGN PATENT DOCUMENTS

WO 1999009349 2/1999
WO 2015144990 10/2015

OTHER PUBLICATIONS

Extended European Search Report for Application No. 20153257.9 dated May 29, 2020.

(Continued)

*Primary Examiner* — Oluseye Iwarere
*Assistant Examiner* — Michael Chiang
(74) *Attorney, Agent, or Firm* — Merchant & Gould P.C.

(57) ABSTRACT

A light system includes a substrate, one or more light emitting diodes (LEDs) coupled to the substrate, and an optical distribution plate positioned proximate the substrate. The optical distribution plate includes one or more optical structures each corresponding to the one or more LEDs. The one or more optical structures include a first surface that focuses LED light from the corresponding LED in a first orientation, and an opposite second surface that distributes LED light from the LED in a second orientation. The second orientation being substantially orthogonal to the first orientation.

20 Claims, 13 Drawing Sheets

Related U.S. Application Data

(60) Provisional application No. 62/796,933, filed on Jan. 25, 2019.

(56) References Cited

U.S. PATENT DOCUMENTS

| | | | |
|---|---|---|---|
| 5,806,955 A | 9/1998 | Parkyn, Jr. et al. | |
| 6,607,286 B2 | 8/2003 | West et al. | |
| D528,226 S | 9/2006 | Nagai | |
| D591,695 S | 5/2009 | Oh | |
| 7,674,018 B2 | 3/2010 | Holder et al. | |
| 7,686,481 B1 | 3/2010 | Condon et al. | |
| D621,804 S | 8/2010 | Sip | |
| 7,874,703 B2 | 1/2011 | Shastry et al. | |
| 7,891,835 B2 | 2/2011 | Wilcox | |
| D634,883 S | 3/2011 | Kim | |
| D636,925 S | 4/2011 | Kawogoe | |
| 8,246,200 B2 * | 8/2012 | Lai | F21V 7/0083 362/330 |
| D683,482 S | 5/2013 | Bierhuizen | |
| D694,947 S | 12/2013 | Liang | |
| 8,628,222 B2 | 1/2014 | Kelley | |
| D699,388 S | 2/2014 | Park | |
| D700,584 S | 3/2014 | Bhat | |
| D715,991 S | 10/2014 | Zhang | |
| D723,211 S | 2/2015 | Hsu | |
| 9,054,286 B1 | 6/2015 | Chen | |
| D735,400 S | 7/2015 | Vaysylyev | |
| D744,155 S | 11/2015 | Radl | |
| D744,694 S | 12/2015 | Goltche | |
| 9,234,650 B2 | 1/2016 | Dieker | |
| 9,267,666 B2 | 2/2016 | Takayama | |
| 9,341,341 B1 | 5/2016 | Wu | |
| 9,494,300 B2 | 11/2016 | Takayama et al. | |
| 9,534,761 B2 | 1/2017 | Harada | |
| D779,709 S | 2/2017 | Liu | |
| 9,651,206 B2 | 5/2017 | Vasta et al. | |
| 9,689,554 B1 | 6/2017 | Householder | |
| 9,732,933 B2 | 8/2017 | Watanabe | |
| 9,784,430 B2 | 10/2017 | Shen et al. | |
| 9,803,834 B2 | 10/2017 | Beijer et al. | |
| 9,810,403 B2 | 11/2017 | Wang | |
| 9,829,689 B2 | 11/2017 | Hukkanen | |
| 9,835,309 B2 | 12/2017 | Cho | |
| D809,188 S | 1/2018 | Li | |
| 9,939,128 B2 | 4/2018 | Tsai | |
| D816,892 S | 5/2018 | Wang | |
| 10,145,531 B2 | 12/2018 | Leung | |
| D845,919 S | 4/2019 | Watanabe | |
| D862,403 S | 10/2019 | Nakanishi | |
| D881,447 S | 4/2020 | Hu | |
| D901,752 S | 11/2020 | Merriam | |
| D903,187 S | 11/2020 | Merriam | |
| D922,669 S | 6/2021 | Merriam | |
| D933,877 S | 10/2021 | Merriam | |
| 11,236,887 B2 * | 2/2022 | Merriam | G02B 27/0916 |
| 2004/0080938 A1 | 4/2004 | Holman | |
| 2004/0105171 A1 * | 6/2004 | Minano | G02B 3/08 359/728 |
| 2004/0189933 A1 | 9/2004 | Sun et al. | |
| 2006/0109673 A1 | 5/2006 | Godoy | |
| 2009/0129084 A1 | 5/2009 | Tsao | |
| 2009/0279311 A1 | 11/2009 | Yu | |
| 2010/0134043 A1 | 6/2010 | Otani | |
| 2010/0246173 A1 | 9/2010 | Wei et al. | |
| 2011/0038151 A1 | 2/2011 | Carraher et al. | |
| 2011/0228403 A1 | 9/2011 | Masuda | |
| 2012/0140483 A1 | 6/2012 | Chang | |
| 2012/0211779 A1 | 8/2012 | Yamamoto | |
| 2014/0003059 A1 * | 1/2014 | Wang | F21V 5/048 362/327 |
| 2014/0015405 A1 | 1/2014 | Hsin | |
| 2015/0117021 A1 * | 4/2015 | Chinniah | F21K 9/65 362/335 |
| 2015/0129910 A1 | 5/2015 | Sekowski | |
| 2016/0033689 A1 * | 2/2016 | Streppel | F21V 5/045 359/743 |
| 2016/0047528 A1 | 2/2016 | Goldstein | |
| 2016/0072030 A1 | 3/2016 | Streppel | |
| 2016/0133771 A1 * | 5/2016 | Pelletier | G02B 17/006 703/1 |
| 2016/0146426 A1 | 5/2016 | Wu | |
| 2016/0348874 A1 | 12/2016 | Aruga | |
| 2017/0227190 A1 | 8/2017 | Fujikawa | |
| 2017/0350573 A1 | 12/2017 | Fleszewski et al. | |
| 2018/0196167 A1 | 7/2018 | Fujikawa | |
| 2018/0292071 A1 * | 10/2018 | Tarsa | F21V 5/08 |
| 2018/0294389 A1 * | 10/2018 | Tarsa | G02B 19/0061 |
| 2018/0306405 A1 | 10/2018 | Kong | |
| 2019/0204529 A1 * | 7/2019 | Yu | G02B 7/022 |
| 2019/0305180 A1 | 10/2019 | Lee | |
| 2020/0028037 A1 | 1/2020 | Kumar | |
| 2020/0149707 A1 | 5/2020 | Chen | |
| 2020/0240613 A1 | 7/2020 | Merriam | |

OTHER PUBLICATIONS

European Office Action in Application 20153257.9, dated Jun. 9, 2021, 5 pages.

* cited by examiner

OPTICAL STRUCTURES FOR LIGHT EMITTING DIODES (LEDS)

CROSS-REFERENCE TO RELATED APPLICATIONS

This application is a continuation of U.S. patent application Ser. No. 16/748,443, now U.S. Pat. No. 11,236,887, filed Jan. 21, 2020, which claims priority to and the benefit of U.S. Provisional Patent Application No. 62/796,933, filed Jan. 25, 2019, the disclosures of which are hereby incorporated by reference herein in their entireties.

BACKGROUND

The present disclosure relates generally to light emitting diode (LED) lighting systems, and more specifically, to systems, methods, and assemblies regarding optical structures for LED lighting systems.

Some known light systems use LEDs as a light source. LEDs can provide instant illumination with no warm-up required. LEDs are also shock and vibration resistant. Additionally, LEDs can increase energy savings. Some applications for LED-based light systems include hazardous environments where electrical and thermal abnormalities are to be avoided to prevent explosion or other fire hazards.

Some known LED light system designs include a polycarbonate plate with individual bubble domes that surrounds and virtually encapsulates the LED itself. The domes can bend the light generated by the LEDs to a required or desired distribution pattern. These domes, however, are often positioned very close to the LED and may result in thermal and/or radiometric power incident on the optic plate, which is undesirable.

SUMMARY

Aspects of the present disclosure relate to a light system including: a substrate; one or more LEDs coupled to the substrate; and an optical distribution plate positioned proximate the substrate, the optical distribution plate including one or more optical structures each corresponding to the one or more LEDs, wherein the one or more optical structures include: a first surface that focuses LED light from the corresponding LED in a first orientation; and an opposite second surface that distributes LED light from the LED in a second orientation, wherein the second orientation is substantially orthogonal to the first orientation.

In an example, the second surface includes at least one total internal reflection (TIR) element and at least one refractive element. In another example, a centerline plane extending along the first orientation is defined on the second surface, and the at least one TIR element and the at least one refractive element are positioned symmetrically about the centerline plane. In yet another example, the at least one TIR element reflects LED light substantially away from, or across, the centerline plane, and the at least one refractive element refracts LED light substantially away from the centerline plane. In still another example, the optical distribution plate forms an Illuminating Engineering Society of North America (IESNA) type I beam pattern. In an example, the first surface includes a Fresnel element.

In another example, the optical distribution plate forms an Illuminating Engineering Society of North America (IESNA) type III beam pattern. In yet another example, a centerline plane extending along the second orientation is defined on the first surface, and the first surface focuses LED light towards one side of the centerline plane. In still another example, the first surface includes at least one total internal reflection (TIR) element and at least one refractive element. In an example, the first surface is disposed adjacent to and spaced away from the corresponding LED. In another example, a reflector plate is disposed between the substrate and the optical distribution plate.

In another aspect, the technology relates to an optical structure for a LED including: an inner surface positionable adjacent to the LED that focuses LED light emitted from the LED in a first direction; and an opposite outer surface that distributes LED light emitted from the LED in a second direction, wherein the second direction is substantially orthogonal to the first direction, and wherein the outer surface includes a plurality of total internal reflection (TIR) elements and a plurality of refractive elements.

In an example, a centerline plane extending along the first direction is defined on the outer surface, and a set of single TIR elements are positioned symmetrically adjacent the centerline plane and each single TIR element reflects LED light substantially away from the centerline plane. In another example, wherein a set of refractive elements are positioned symmetrically about the centerline plane and outside of the set of single TIR elements, and each refractive element of the set of refractive elements refracts LED light substantially away from the centerline plane. In yet another example, a set of double TIR elements are positioned symmetrically about the centerline plane and outside of the set of refractive elements, and each double TIR element reflects LED light substantially away from and across the centerline plane. In still another example, the set of refractive elements is a first set of refractive elements and a second set of refractive elements are positioned symmetrically about the centerline plane and outside of the set of double TIR elements, and each refractive element of the second set of refractive elements refracts LED light substantially away from the centerline plane. In an example, the inner surface includes a Fresnel element. In another example, the inner surface includes at least one TIR element and at least one refractive element, wherein a centerline plane extending along the second direction is defined on the inner surface, and the at least one TIR element is offset from the centerline plane and reflects LED light substantially towards the centerline plane.

In another aspect, the technology relates to a method of manufacturing an optical structure for a LED including: forming a first surface of the optical structure that focuses LED light emitted from the LED in a first orientation; and forming a second surface of the optical structure that distributes LED light emitted from the LED in a second orientation, wherein the second orientation is substantially orthogonal to the first orientation, and wherein forming the second surface includes: defining a plurality of total internal reflection (TIR) elements on the second surface; and defining a plurality of refractive elements on the second surface, wherein the plurality of TIR elements and the plurality of refractive elements are arranged symmetrically about a centerline plane extending along the first orientation defined on the outer surface.

In an example, forming the first surface includes: defining at least one TIR element on the first surface, wherein the at least one TIR element is offset from a centerline plane extending along the second orientation defined on the first surface; and defining at least one refractive element on the first surface.

A variety of additional inventive aspects will be set forth in the description that follows. The inventive aspects can relate to individual features and to combinations of features.

It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

The optical structures described herein have features that form a predetermined beam pattern from a light emitting diode (LED), which generally emit light beams in a Lambertian pattern. These optical structures can narrow the light beams along a first orientation, while widening the light beams along a substantially orthogonal second orientation. As such, the light systems that contain the optical structures can, for example, be placed near the center of a pathway and provide lighting for narrower paths or roadways and extend the light down the pathway in either direction. In another example, the light systems can be placed towards one side of the pathway and provide lighting that projects more across the pathway as well as extend the light down the pathway in either direction. Additionally, the optical structures have features that move the optic surface that faces the LED further away from the LED. This position change increases airflow around the optic surface and the LED, and reduces thermal and/or radiometric power incident on the optic surface. Thereby, increasing the performance of the light system.

The optical structures described herein also may be used within existing light system housings such that many of the components do not need to be modified.

In the below examples, the optical structures have a first surface that focuses the LED light in the first orientation and an opposite second surface that distributes the LED light in the second orientation. Sometimes this beam pattern may be referred to as a high angle batwing pattern that is often difficult to achieve with optic surfaces that are spaced away from the LED. As such, the first surface includes features that increase the spacing gap between the optic surface and the LED. In one example, the first surface may include a Fresnel element that is configured to narrow the LED light in the first orientation. In another example, the first surface may include one or more total internal reflection (TIR) elements and at least one refractive elements that are sized and shaped to narrow the LED light in the first orientation. Additionally, the second surface includes one or more total internal reflection (TIR) elements and at least one refractive elements. These elements on the second surface are configured to widen the LED light in the second orientation.

Figure 1:
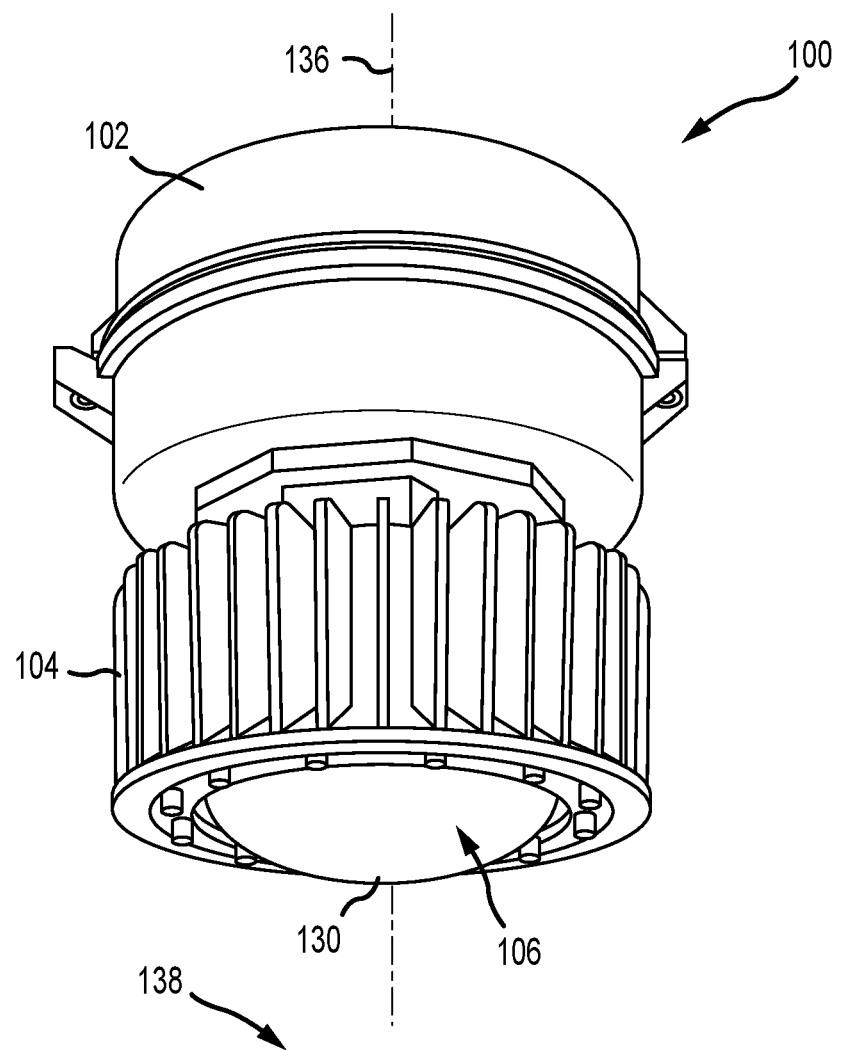
FIG. 1 is a perspective view of an exemplary light system.
Figure 2:
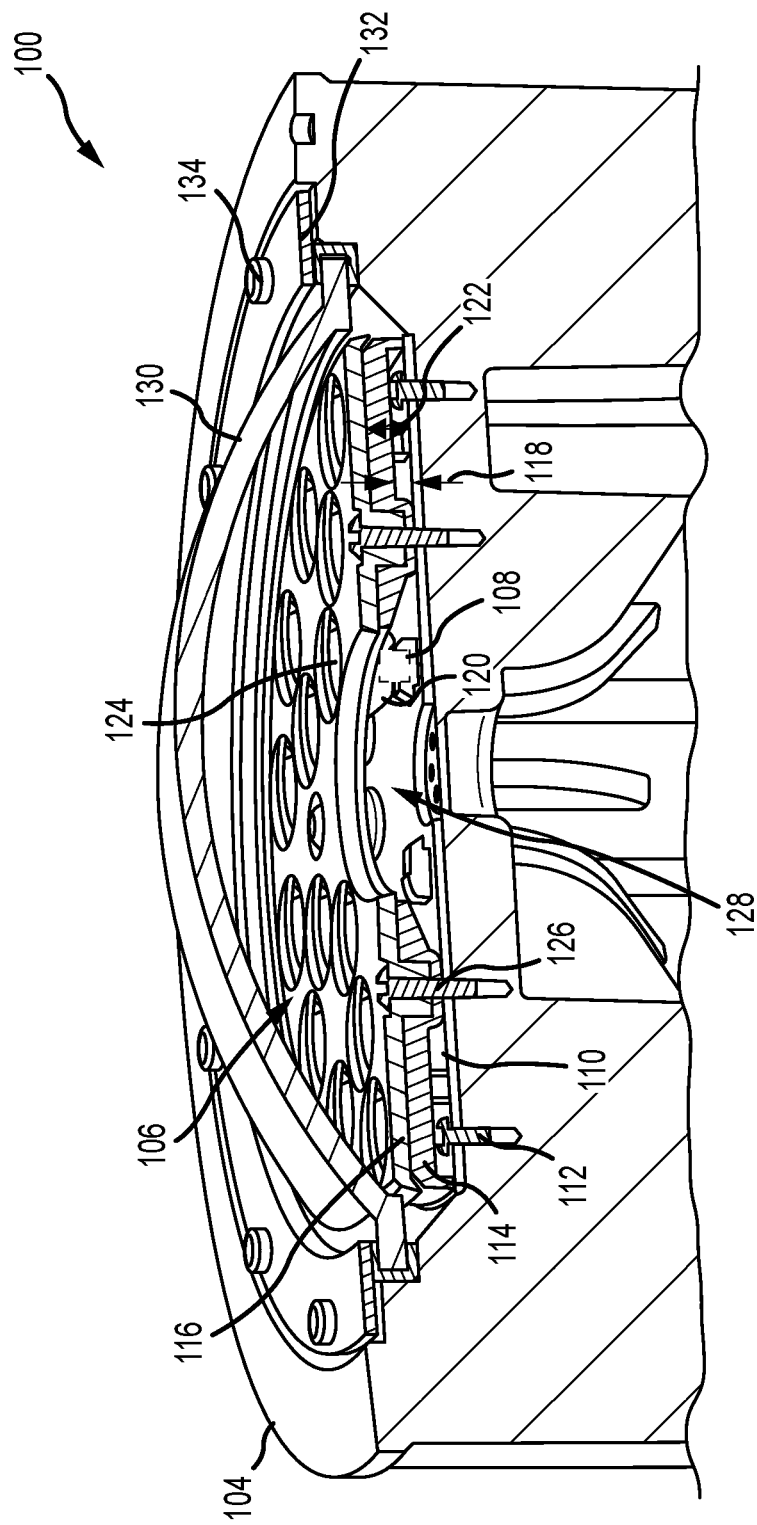
FIG. 2 is a partial perspective cross-sectional view of the light system shown in FIG. 1.

FIG. 1 is a perspective view of an exemplary light system 100. FIG. 2 is a partial perspective cross-sectional view of the light system 100. Referring concurrently to FIGS. 1 and 2, the light system 100 includes a driver compartment 102 that houses a driver assembly (not shown) that can include a power supply and enable operation thereof. Coupled to the driver compartment 102 is a heat sink assembly 104 that supports an LED system 106. In the example, the LED system 106 includes one or more LEDs 108 coupled to a substrate 110. In some examples, the substrate 110 is an LED substrate that may include a printed circuit board (PCB) assembly that provides the necessary electrical connections to the LEDs 108 and other electrical components of the light system 100. The substrate 110 is connected to the heat sink assembly 104 by one or more fasteners 112. In other examples, the substrate 110 may be a heat sink substrate having the LEDs 108 and other components mounted directly thereto.

The LED system 106 also includes a reflector plate 114 positioned proximate the substrate 110 and an optical distribution plate 116 covering the reflector plate 114. The reflector plate 114 is disposed between the substrate 110 and the optical distribution plate 116 and is spaced apart from the substrate 110 with a gap 118. The reflector plate 114 includes one or more cones 120 that extend towards the substrate 110 and correspond in location with the LEDs 108 on the substrate 110. Each LED 108 may be at least partially disposed within one end of the cone 120 such that the emitted light is directed towards the optical distribution plate 116. The optical distribution plate 116 is adjacent to the reflector plate 114 and opposite of the substrate 110 and is also spaced apart from the substrate 110 with a gap 122. The optical distribution plate 116 includes one or more optical structures 124 that correspond in location with the LEDs 108 and the cones 120. As such, each optical structure 124 covers the opposite end of the cone 120 from the LED 108 with the optical structure 124 spaced apart from the LED 108. The reflector plate 114 and the optical distribution plate 116 are connected to the heat sink assembly 104 by one or more fasteners 126 via a nested screw boss so as to space the plates 114, 116 away from the substrate 110 and form an air gap 128 therebetween.

A cover 130 may at least partially surround the LED system 106 and enclose it within the heat sink assembly 104. The cover 130 is transparent or translucent so as to enable light to be emitted from the light system 100. The cover 130 may be coupled to the heat sink assembly 104 via a gasket 132 and one or more fasteners 134.

In operation, the LEDs 108 emit light so that the light system 100 can illuminate a required or desired area. The light system 100 defines a longitudinal axis 136 with the LED system 106 disposed at one end of the axis 136, and as such, the light system 100 generally directs the light towards one end 138 of the longitudinal axis 136 (e.g., in a downward direction if the light system 100 is mounted overhead). Furthermore, the optical distribution plate 116 includes one or more optical characteristics that are described further below so that the light emitted from the LEDs 108 can further be distributed in predetermined orientations and patterns for the illuminated area. That is, the light system 100 may be configured for a specific light distribution profile and to project a predetermined pattern of light onto a surface (e.g., a walkway or roadway). One classification system that is used to describe the pattern of the illuminated area by the light system 100 is established by the Illumination Engineering Society of North America (IESNA). Two types of IESNA patterns are described further below in reference to FIGS. 3 and 4.

Figure 3:
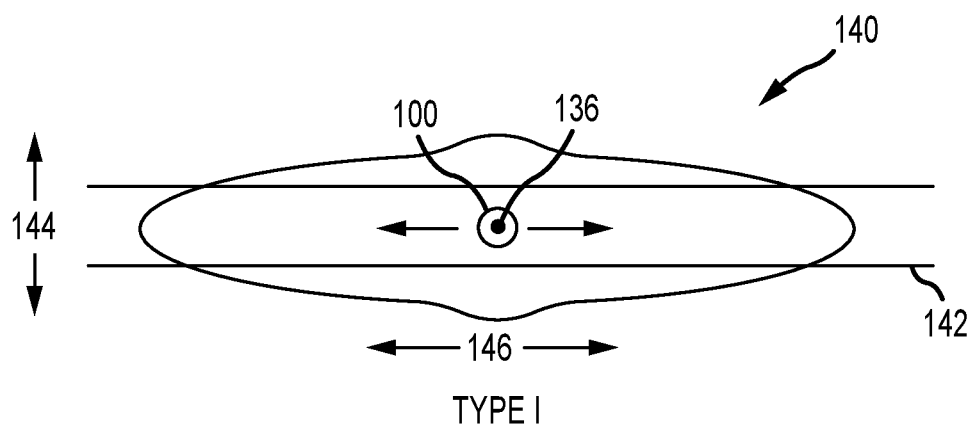
FIG. 3 is a schematic view of a first type of beam distribution pattern.

FIG. 3 is a schematic view of a first type of beam distribution pattern 140. The pattern 140 is characterized as an IESNA Type I beam pattern that is used when the light system 100 is placed near the center of a pathway 142 and provides lighting for narrower paths or roadways. The pattern 140 is a two-way lateral light distribution with the light being substantially directed in opposite directions. That is, the longitudinal axis 136 of the light system 100 can be generally aligned with a z-axis (in and out of the page) and the pattern 140 narrows the light along a y-axis direction 144 and widens the light along an x-axis direction 146. In the example, the optical distribution plate 116 (shown in FIGS. 1 and 2) can include one or more optical characteristics to distribute the LED light and substantially form pattern 140.

Figure 4:
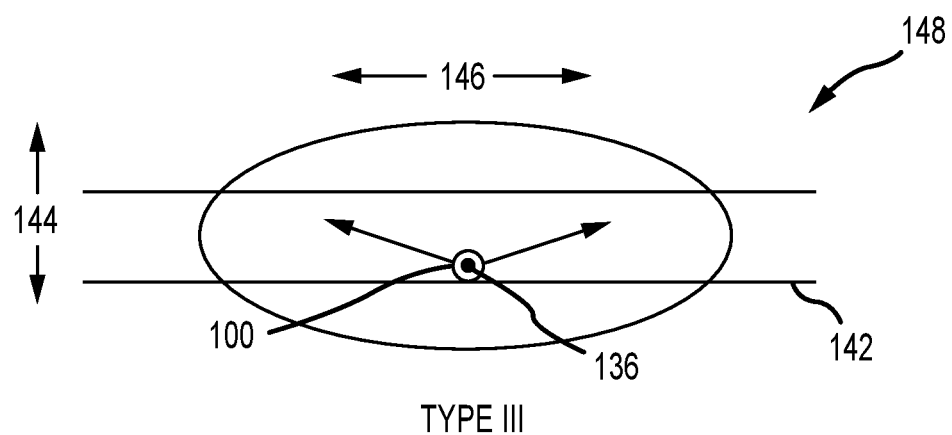
FIG. 4 is a schematic view of a second type of beam distribution pattern.

FIG. 4 is a schematic view of a second type of beam distribution pattern 148. The pattern 148 is characterized as an IESNA Type III beam pattern that is used when the light system 100 is placed towards one side of the pathway 142 and provides lighting that projects more outward in the positive y-axis direction 144 (e.g., towards the top of the page). The pattern 148 is a three-way light distribution with the light being substantially directed in opposite directions and in one substantially orthogonal direction. That is, the pattern 148 extends the light along the positive y-axis direction 144 and narrows the light along the negative y-axis direction 144, while widening the light along the x-axis direction 146. In the example, the optical distribution plate 116 (shown in FIGS. 1 and 2) can include one or more optical characteristics to distribute the LED light and substantially form pattern 148. It should be appreciated that the one or more optical characteristics of the optical distribution plate 116 described further below may be used to form any other type of beam distribution pattern as required or desired.

Figure 5:
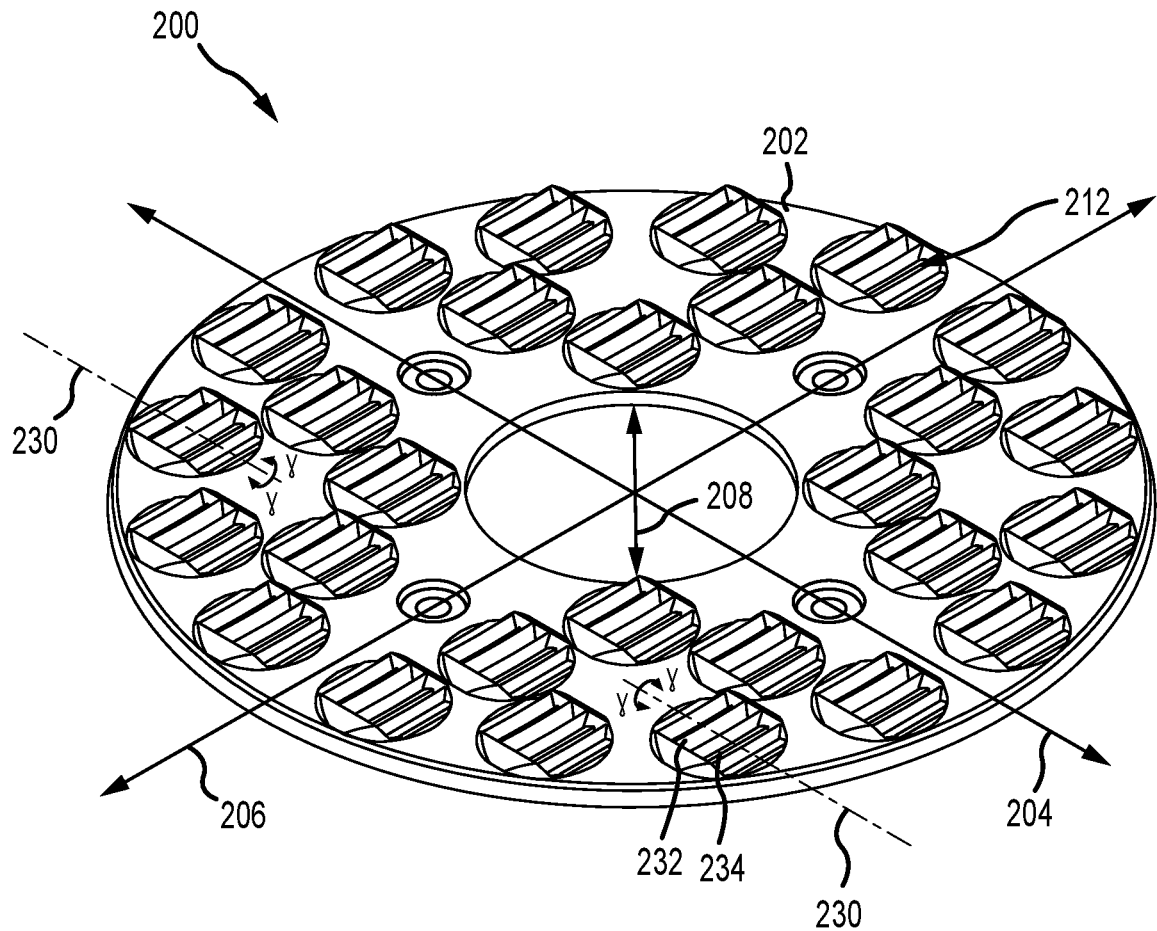
FIG. 5 is a top perspective view of an exemplary optical distribution plate for the light system shown in FIGS. 1 and 2.
Figure 6:
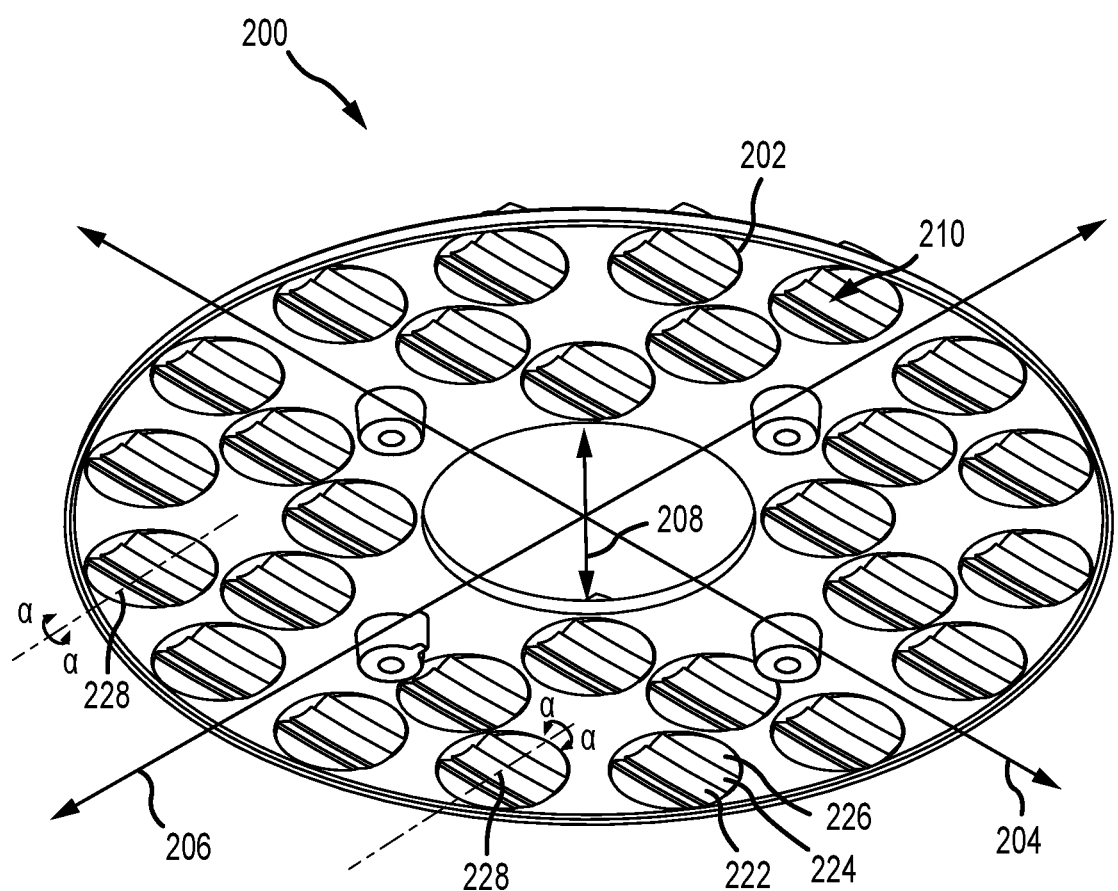
FIG. 6 is a bottom perspective view of the optical distribution plate shown in FIG. 5.

FIG. 5 is a top perspective view of an exemplary optical distribution plate 200 for the light system 100 (shown in FIGS. 1 and 2). FIG. 6 is a bottom perspective view of the optical distribution plate 200. Referring concurrently to FIGS. 5 and 6, the optical distribution plate 200 is configured to nest on top of the reflector plate (shown in FIG. 2) and is formed from transparent and/or translucent materials (e.g., polycarbonate). The optical distribution plate 200 includes one or more optical structures 202 that each corresponds to an LED light (not shown). In the example, the optical distribution plate 200 includes (28) optical structures 202 defined in a substantially hollow cylindrical plate 200. In other examples, any other shape of the plate 200 and/or other number of optical structures 202 may be used as required or desired. In the example, the optical distribution plate 200 forms an IESNA type I beam pattern (see FIG. 3).

The optical distribution plate 200 defines an x-axis 204 and a y-axis 206, with a z-axis 208 being orthogonal thereto. A bottom surface 210 (shown in FIG. 6) of each of the optical structures 202 is positioned adjacent to the LED and is sized and shaped to receive the LED light. The bottom surface 210 focuses the light in a first orientation that is substantially parallel to the y-axis 206. A top surface 212 (shown in FIG. 5) of each of the optical structures 202 is sized and shaped to emit the LED light and distribute the light in a second orientation that is substantially parallel to the x-axis 204. The first orientation aligned with the y-axis 206 being substantially orthogonal to the second orientation aligned with the x-axis 204. As such, both the bottom and top surfaces 210, 212 work in conjunction to form the IESNA type I beam pattern (e.g., narrowing the light along the y-axis 206 and widening the light along the x-axis 204). To perform this function, the bottom surface 210 includes a Fresnel element and the top surface 212 includes one or more total internal reflection (TIR) elements and one or more refractive elements, with the Fresnel element extending in a direction that is substantially orthogonal to the TIR/refractive elements. The structure of the optical structures 202 is described further below in FIGS. 7-12.

As used herein, TIR is a type of optical surface that reflects the light beam so that the light beam substantially changes direction. These TIR surfaces reflect the light beam in such a way that the angle at which the beams approach the surface approximately equals the angle at which the beams reflect off the surface. In contrast, refraction is a type of optical surface that changes the direction of the light beam as the beams pass through the surface. Thus, refraction may be also considered as bending the path of the beams, while the beams substantially maintain the same general direction.

Figure 7:
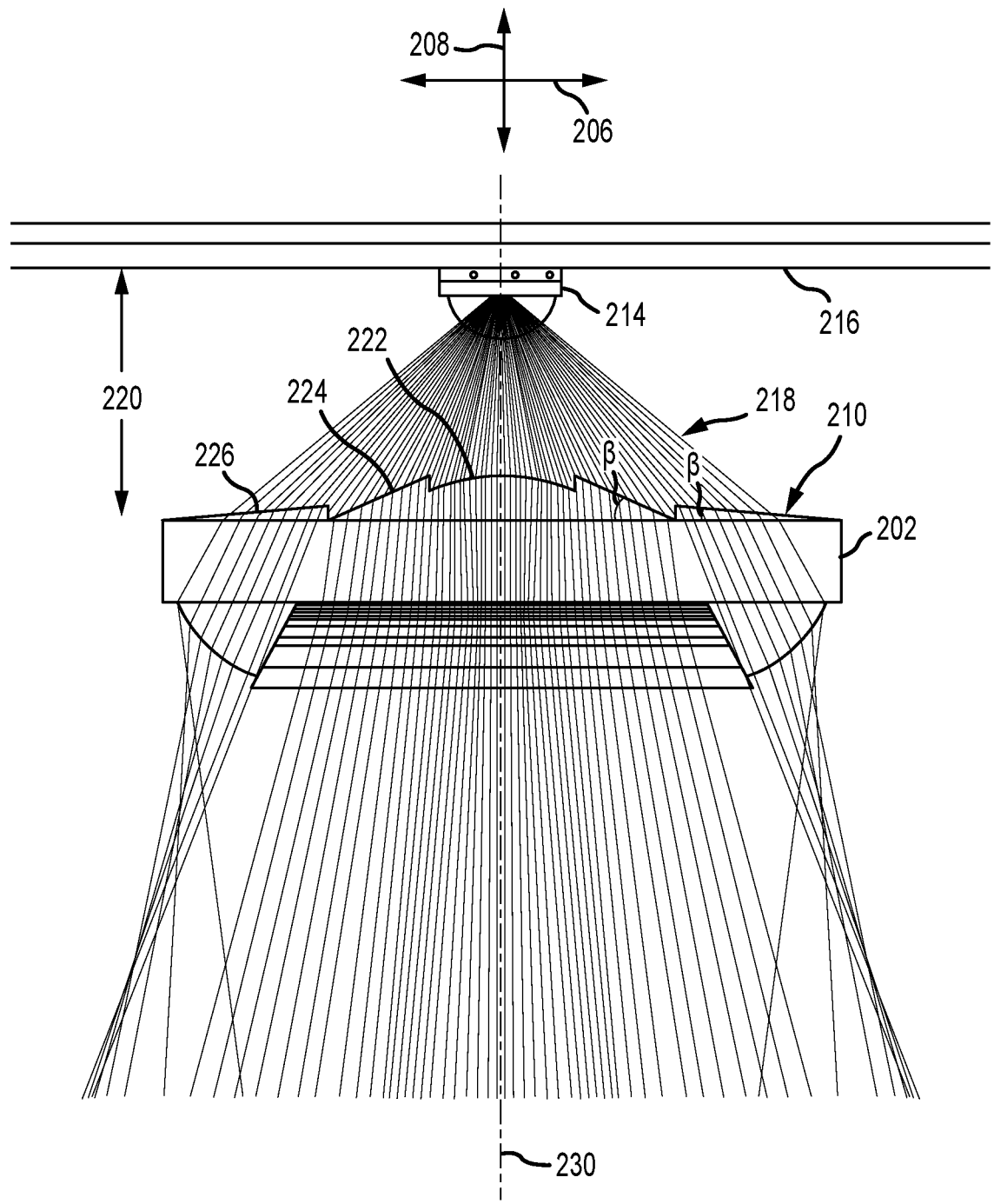
FIG. 7 is a schematic view of an optical structure of the optical distribution plate shown in FIGS. 5 and 6 illustrating light distribution along a y-axis.

FIG. 7 is a schematic view of the optical structure 202 of the optical distribution plate 200 (shown in FIGS. 5 and 6) illustrating light distribution along the y-axis 206. With continued reference to FIGS. 5 and 6 and as described above, an LED 214 may be coupled to a PCB substrate 216 such that light 218 is emitted in the z-axis 208 direction. The reflector plate is not illustrated for clarity in FIG. 7, but may be disposed between the optical distribution plate 200 and the PCB substrate 216. The optical structure 202 is positioned over the LED 214 such that the light 218 (schematically illustrated as light beams) is channeled therethrough. The bottom surface 210 is adjacent to, but offset from, the LED 214 and forms an air gap 220 between the LED 214 and the optical structure 202 and reduces thermal and/or radiometric power incident on the material forming the optical distribution plate 200.

The bottom surface 210 includes a Fresnel element that enables the optical structure 202 to capture the light 218 emitted by the LED 214 and focus (e.g., narrow) the emitted LED light 218 in a direction along the y-axis 206. The Fresnel element enables the optical structure 202 to have a large optical aperture that the light 218 travels through and a short focal length with a thinner lens structure than compared to a conventional design (e.g., a spherical convex lens). As such, the optic surface of the bottom surface 210 forms a larger air gap 220 for increased airflow and reduces incident power when compared to the conventional design in the light system. In the example, the Fresnel element is a non-imaging linear Fresnel lens that focuses the light 218 into a narrow elongate band in the y-axis 206 direction. The Fresnel element, includes one or more segments 222, 224, 226, that extend substantially along the x-axis 204 direction (shown in FIG. 6). This orientation of the segments 222, 224, 226 facilitates focusing the light 218 in the substantially orthogonal y-axis 206 direction. The segments 222, 224, 226 are also all refractive elements that generally change the direction of the light beams 218 as they pass through the bottom surface 210 of the optical structure 202.

With reference to FIG. 6, a first centerline plane 228 extends substantially parallel to the y-axis 206 direction and divides the bottom surface 210 in half. Each segment 222, 224, 226 may be curved relative to the first centerline plane 228 such that when looking down in the z-axis 208 direction the segments are substantially C-shaped along the x-axis 204 direction. Additionally, in the example, the orientation of each segment 222, 224, 226 (e.g., the direction of the curve relative to the first centerline plane 228) may be rotated approximately 180° in the optical structures 202 that are on either side of the y-axis 206. This different orientation of the optical structures 202 facilitates evening out the light pattern in the y-axis 206 direction. In another example, each quadrant of optical structures 202 may have a different segment 222, 224, 226 orientations. In other examples, each optical structure 202 may have different segment orientations, or each optical structure 202 may have the same segment orientation.

The C-shaped curve of the segments 222, 224, 226 enable increased manufacturing efficiencies and use of diamond turned tooling. As such, the radius of the C-shaped curve may be at least partially based on the method of tooling. In yet another example, one or more of the segments 222, 224, 226 may extend linearly along the x-axis 204 direction. In still another example, one or more of the segments 222, 224, 226 may be substantially V-shaped along the x-axis 204 direction. For example, each segment 222, 224, 226 may be angled a relative to the first centerline plane 228 and the angle $\alpha$ may be between 80° and 89°. In some examples, the C-shaped segments may be offset from the first centerline plane 228. In further examples, the Fresnel element may be a non-imaging spot Fresnel lens with ring-shaped segments.

Referring back to FIG. 7, a second centerline plane 230 extends substantially parallel to the x-axis 204 direction (e.g., in and out of the page) and also divides the bottom surface 210 in half. The segments 222, 224, 226 are positioned symmetrically about the second centerline plane 230 with the first segment 222 centered on the centerline plane 230 and extending to both the left and right side of it. The second segment 224 is positioned on the outside of the first segment 222 with one part on the left side and the other part on the right side of the second centerline plane 230. The third segment 226 is positioned on the outside of the second segment 224 with one part of the left side and the other part on the right side of the second centerline plane 230. The first segment 222 is substantially convex in shape and the second and third segments 224, 226 are substantially linear and disposed at an angle $\beta$ relative to the y-axis 206 direction. The second segment 224 may have a greater angle than the third segment 226. In the example, the second segment 224 may be disposed at the angle $\beta$ between about 15° and 35°. In an aspect, the angle $\beta$ of the second segment 224 may be about 24°. In the example, the third segment 226 may be disposed at the angle $\beta$ between about 1° and 14°. In an aspect, the angle $\beta$ of the third segment 226 may be about 5°. In other example, a number of segments greater than, or less than, three may be used as required or desired. In another example, some or all of the segments may be curved rather than linear, or linear rather than curved. In still other examples, the segments may be offset from the second centerline plane 230 and/or the left side segment parts different than the right side segment parts as required or desired.

Figure 8:
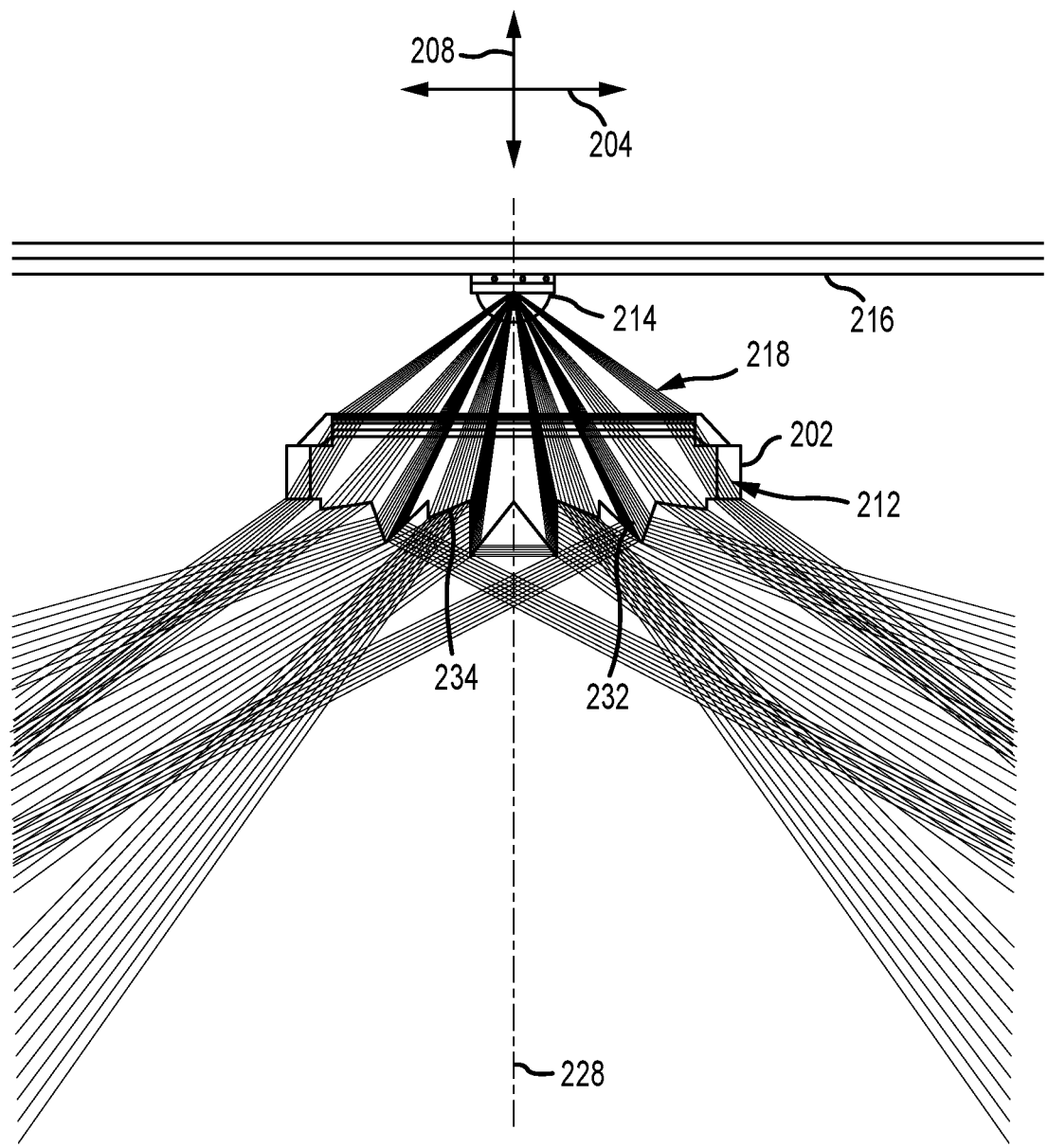
FIG. 8 is a schematic view of the optical structure of the optical distribution plate shown in FIGS. 5 and 6 illustrating light distribution along an x-axis.

FIG. 8 is a schematic view of the optical structure 202 of the optical distribution plate 200 (shown in FIGS. 5 and 6) illustrating light distribution along the x-axis 204. With continued reference to FIGS. 5 and 6, a number of components are described above in FIGS. 5-7, and as such, are not necessarily described further. The top surface 212 includes at least one TIR element 232 and at least one refractive element 234 that in combination distributes (e.g., widens) the emitted LED light 218 in a direction along the x-axis 204. In the example, the TIR elements 232 and the refractive elements 234 extend substantially along the y-axis 206 direction (shown in FIG. 5). This orientation of the elements 232, 234 facilitates throwing the light 218 in the substantially orthogonal x-axis 204 direction and away from the LED 214 further than a typical Lambertian distribution.

With reference to FIG. 5, the second centerline plane 230 extends substantially parallel to the x-axis 204 direction and divides the top surface 212 in half. The TIR element 232 and the refractive element 234 may be curved relative to the second centerline plane 230 such that when looking down in the z-axis direction the elements are substantially C-shaped along the y-axis 206 direction. Additionally, in the example, the orientation of each element 232, 234 (e.g., the curve relative to the second centerline plane 230) may be rotated approximately 180° in the optical structures 202 that are on either side of the y-axis 206. This different orientation of the optical structures 202 facilitates evening out the light pattern in the x-axis 204 direction. In another example, each quadrant of optical structures 202 may have a different element 232, 234 orientations. In other examples, each optical structure 202 may have different element orientations, or each optical structure 202 may have the same element orientation.

As described above the C-shaped curve of the elements 232, 234 enable increased manufacturing efficiencies and use of diamond turned tooling. In yet another example, one or more of the elements 232, 234 may extend linearly along the y-axis 206 direction. In still another example, one or more of the elements 232, 234 may be substantially V-shaped along the y-axis 206 direction. For example, each element 232, 234 may be angled y relative to the second centerline plane 230 and the angle $\gamma$ may be between 80° and 89°. In some examples, the C-shaped elements may be offset from the second centerline plane 230.

Referring back to FIG. 8, the first centerline plane 228 extends along the y-axis 206 (e.g., in and out of the page) and divides the top surface 212 in half. The elements 232, 234 are positioned symmetrically about the first centerline plane 228 and the light 218 may be directed substantially away from, or across, the centerline plane 228 as required or desired to achieve the beam pattern. In other examples, the elements 232, 234 may be offset from the second centerline plane 228 and/or may be different on the left side than the right side of the centerline plane 228. The orientation and the layout of the TIR elements 232 and refractive elements 234 are described further below in reference to FIGS. 9-12.

FIGS. 9-12 are detailed schematic views of the optical structure 202 shown in FIG. 8 illustrating light distribution along the x-axis 204. A number of components are described above in FIGS. 5-8, and as such, are not necessarily described further. It should be appreciated that FIGS. 9-12 illustrate the light beams 218 only on the right side of the first centerline plane 228 for clarity. The light beams 218 on the left side of the centerline plane 228 will be mirrored as illustrated in FIG. 8. Furthermore, while a plurality of TIR elements 232 and a plurality of refractive elements 234 are described below, it should be appreciated that any other number and/or layout of elements 232, 234 may be used so as to enable the beam distribution profile as required or desired (e.g., widening the beam 218 along the x-axis 204 direction).

Figure 9:
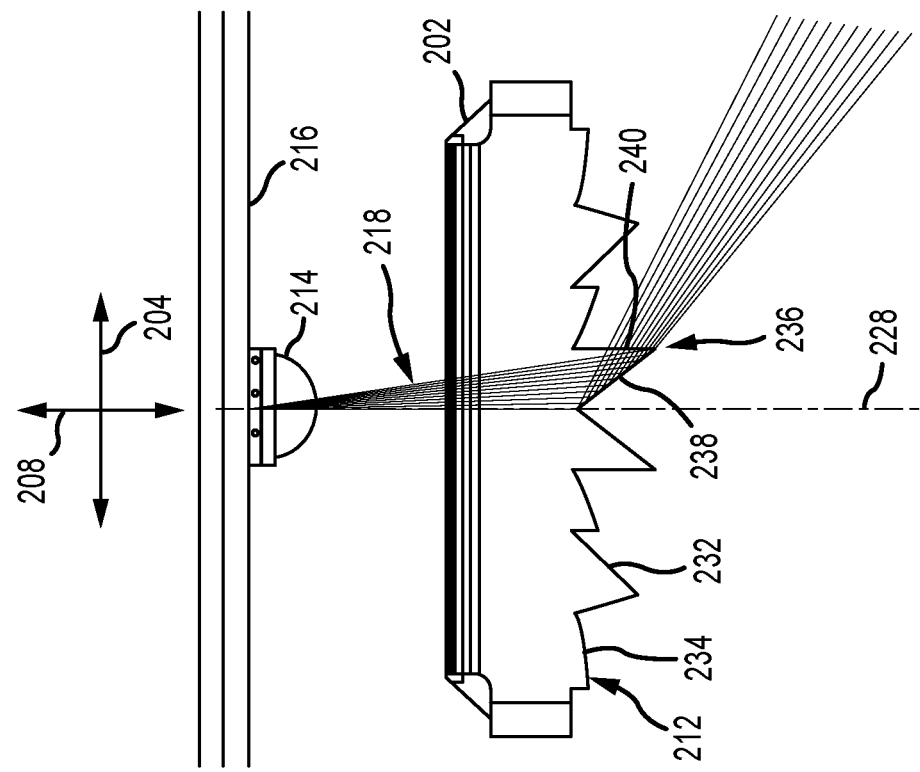

Referring first to FIG. 9, the plurality of TIR elements 232 may include a set of single TIR elements 236 that are positioned symmetrically about the first centerline plane 228 and directly adjacent to one another. The TIR element 236 includes an oblique linear TIR surface 238 that reflects the light 218 substantially away from the centerline plane 228. In examples, the TIR surface 238 may be disposed at an angle relative to a horizontal axis. The angles of TIR surface depend on the index of refraction of the material of the optical structure 202, and as such, this angle is based at least partially on the incident light ray and the material index of refraction so that TIR occurs. The TIR element 236 also includes a refractive surface 240 so that the reflected light 218 from the TIR surface 238 can exit the optical structure 202. The refractive surface 240 may be linear or curved as required or desired.

Figure 10:
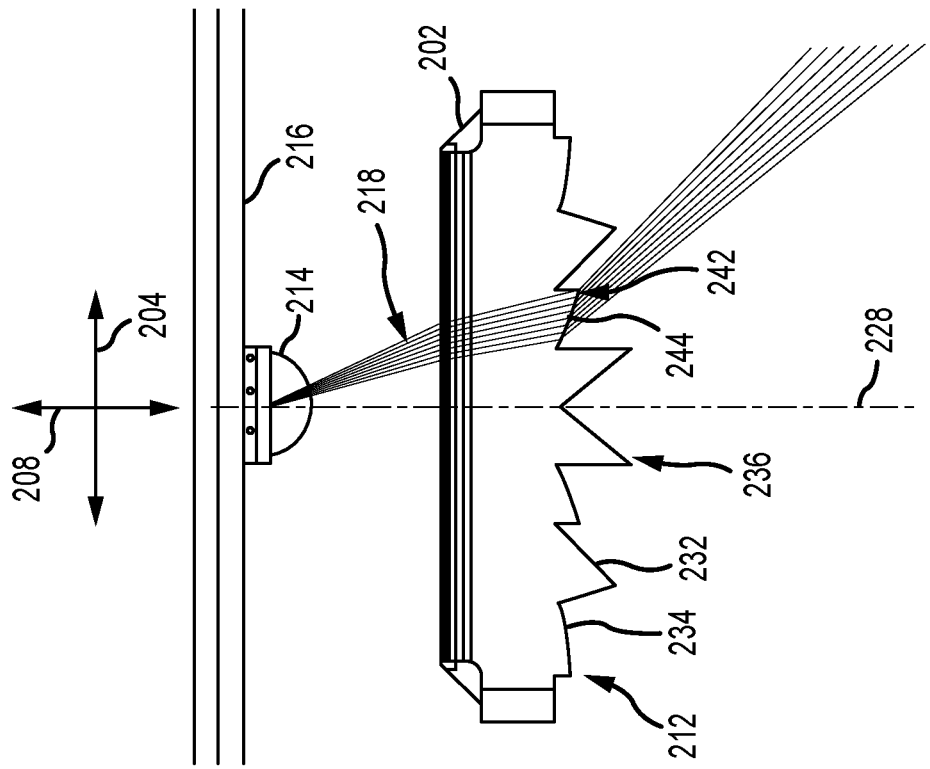
FIGS. 9-12 are detailed schematic views of the optical structure shown in FIG. 8 illustrating light distribution along the x-axis.

FIG. 10 illustrates a first set of refractive elements 242 that are positioned symmetrically about the first centerline plane 228 and outside of the set of single TIR elements 236. The refractive element 242 includes a curved refractive surface 244 that refracts the light 218 substantially away from the centerline plane 228. In other examples, the refractive surface 244 may be linear as required or desired.

Figure 11:
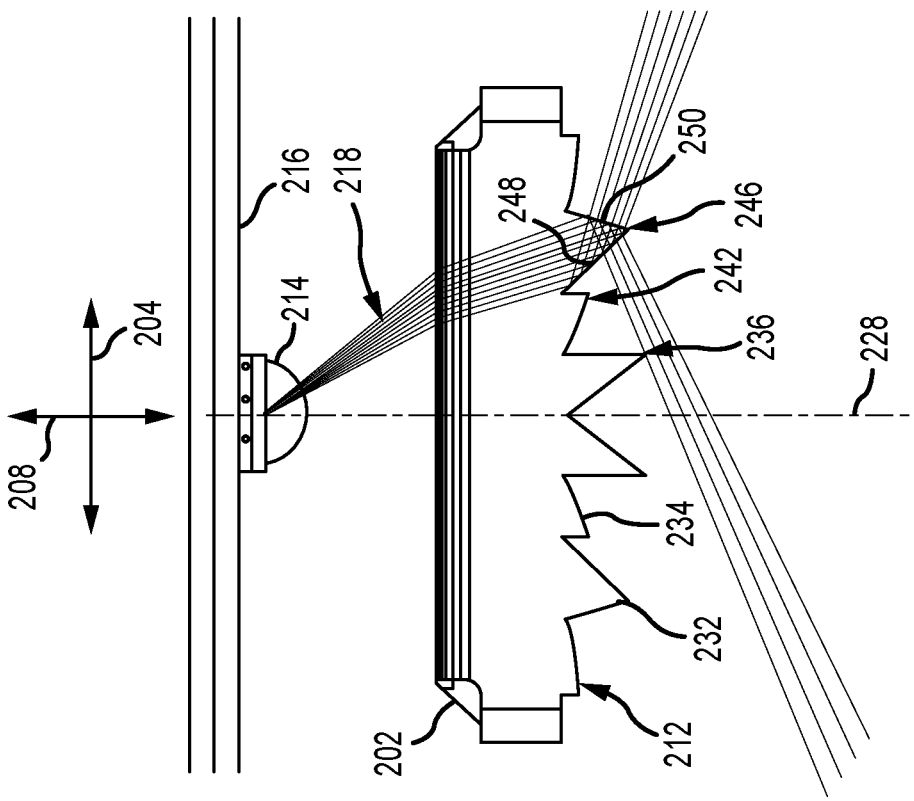

FIG. 11 illustrates a set of double TIR elements 246 that are positioned symmetrically about the first centerline plane 228 and outside of the first set of refractive elements 242. The TIR element 246 includes two oblique linear TIR surfaces 248, 250. The TIR surface 248 reflects the light 218 substantially away from the centerline plane 228 and the TIR surface 250 reflects the light 218 substantially across the centerline plane 228. In the example, TIR surface 248 is disposed at a different angle relative to a horizontal axis than the TIR surface 250. In other examples, these angles may be approximately equal. In examples, the TIR surfaces 248, 250 may be disposed at an angle between relative to a horizontal axis. The angles of TIR surface depend on the index of refraction of the material of the optical structure 202, and as such, this angle is based at least partially on the incident light ray and the material index of refraction so that TIR occurs. In other examples, one or more of the double TIR elements 246 may be at an angle that is approximately equal to the single TIR elements 236 (shown in FIG. 9).

Figure 12:
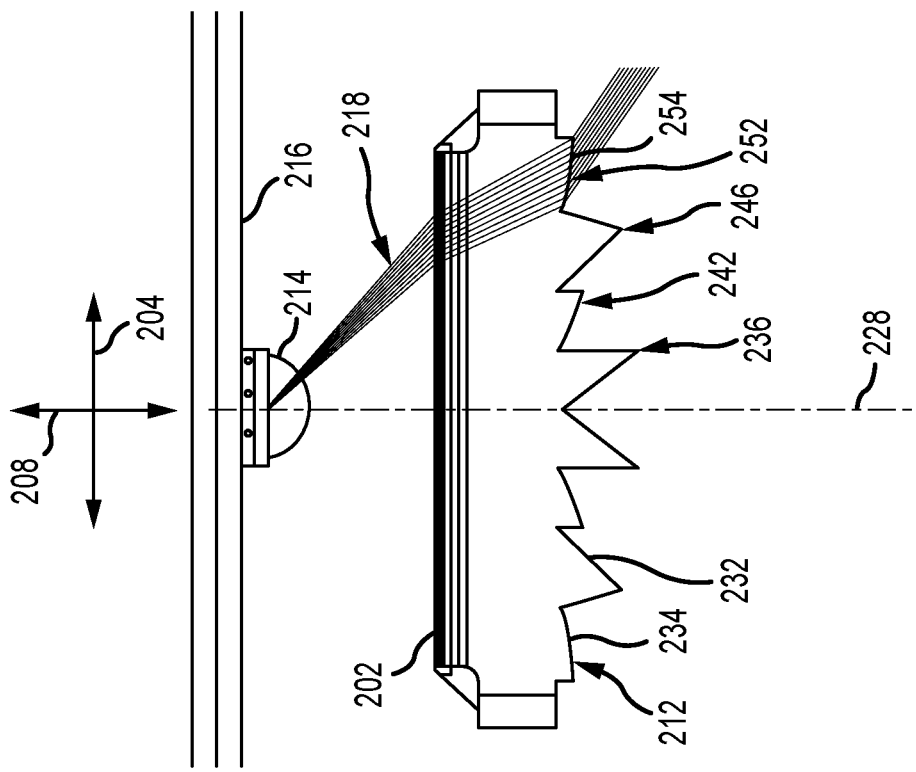

FIG. 12 illustrates a second set of refractive elements 252 that are positioned symmetrically about the first centerline plane 228 and outside of the set of double TIR elements 246. The refractive element 252 includes a curved refractive surface 254 that refracts the light 218 substantially away from the centerline plane 228. In other examples, the refractive surface 244 may be linear as required or desired.

Figure 13:
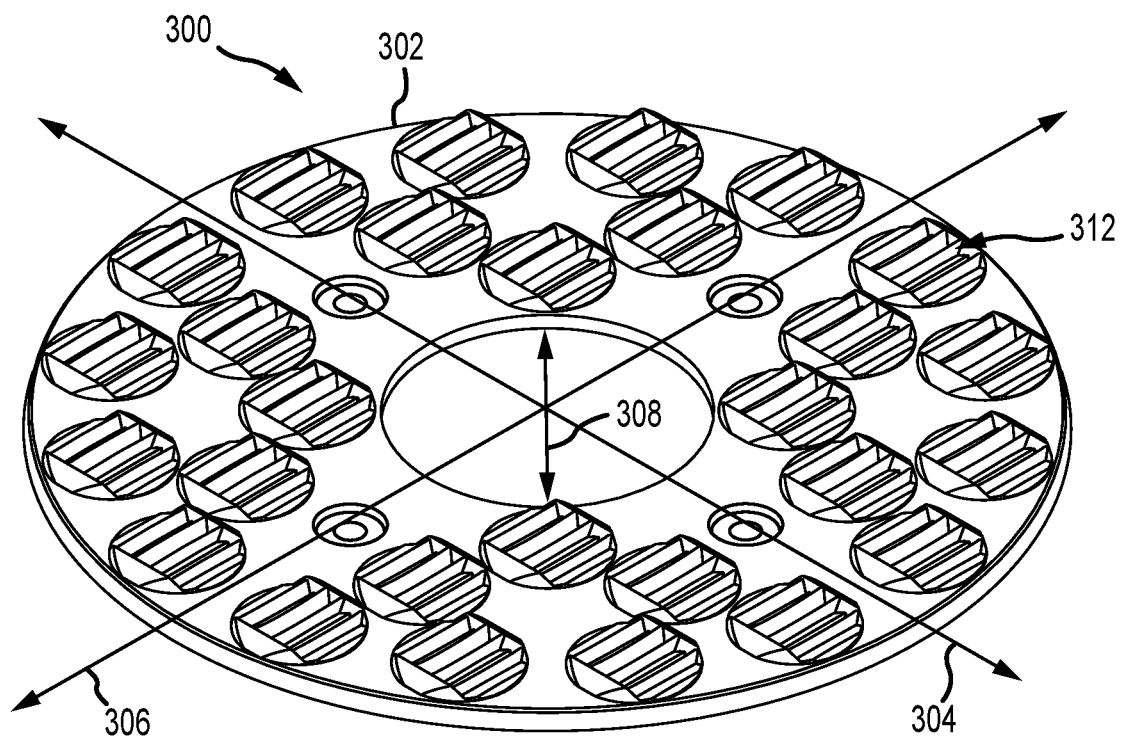
FIG. 13 is a top perspective view of another optical distribution plate for the light system shown in FIGS. 1 and 2.
Figure 14:
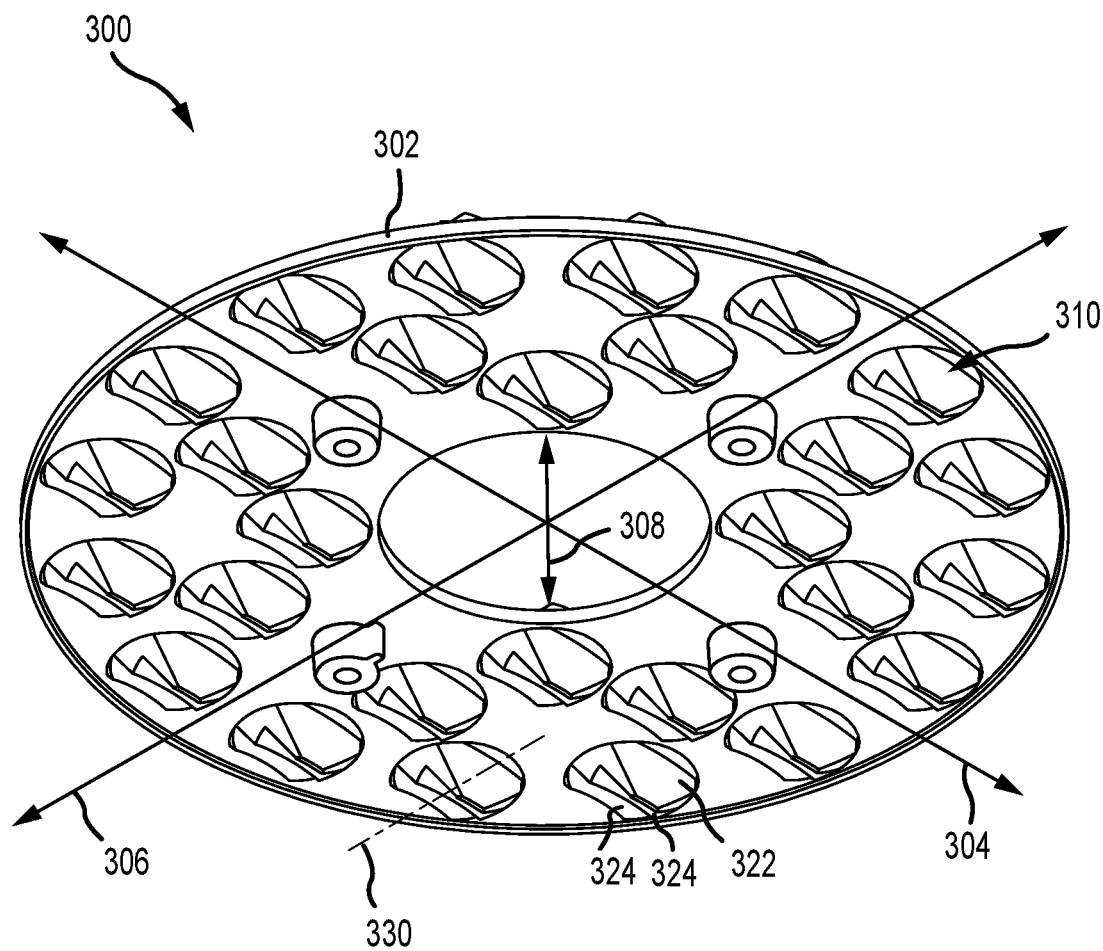
FIG. 14 is a bottom perspective view of the optical distribution plate shown in FIG. 13.

FIG. 13 is a top perspective view of another optical distribution plate 300 for the light system 100 (shown in FIGS. 1 and 2). FIG. 14 is a bottom perspective view of the optical distribution plate 300. Referring concurrently to FIGS. 13 and 14, the optical distribution plate 300 is configured to nest on top of the reflector plate (shown in FIG. 2) and is formed from transparent and/or translucent materials (e.g., polycarbonate). The optical distribution plate 300 includes one or more optical structures 302 that each corresponds to an LED light (not shown). In the example, the optical distribution plate 300 includes (28) optical structures 302 defined in a substantially hollow cylindrical plate 300. In other examples, any other shape of the plate 300 and/or other number of optical structures 302 may be used as required or desired. In the example, the optical distribution plate 300 forms an IESNA type III beam pattern (see FIG. 4).

The optical distribution plate 300 defines an x-axis 304 and a y-axis 306, with a z-axis 308 being orthogonal thereto. A bottom surface 310 (shown in FIG. 14) of each of the optical structures 302 is positioned adjacent to the LED and is sized and shaped to receive the LED light. The bottom surface 310 focuses the light in a first orientation that is substantially parallel to the y-axis 306. A top surface 312 (shown in FIG. 13) of each of the optical structures 302 is sized and shaped to emit the LED light and distribute the light in a second orientation that is substantially parallel to the x-axis 308. The first orientation aligned with the y-axis 306 being substantially orthogonal to the second orientation aligned with the x-axis 304. As such, both the bottom and top surfaces 310, 312 work in conjunction to form the IESNA type III beam pattern (e.g., focusing the light in one direction along the y-axis 306 and widening the light along the x-axis 304). To perform this function, the bottom surface 310 includes one or more total internal reflection (TIR) elements and one or more refractive elements and the top surface 312 also includes one or more TIR elements and one or more refractive elements, with the bottom surface elements extending in a direction that is substantially orthogonal to the top surface elements.

In the example, the top surface 312 of the optical structures 302 have TIR elements and refractive elements that are similar to the top surface structure described above in FIGS. 5 and 8-12, and as such, the structure of the top surface 312 is not described further herein. However, the bottom surface 310 is different than the example described above, and thus, is described further below in FIG. 15.

Figure 15:
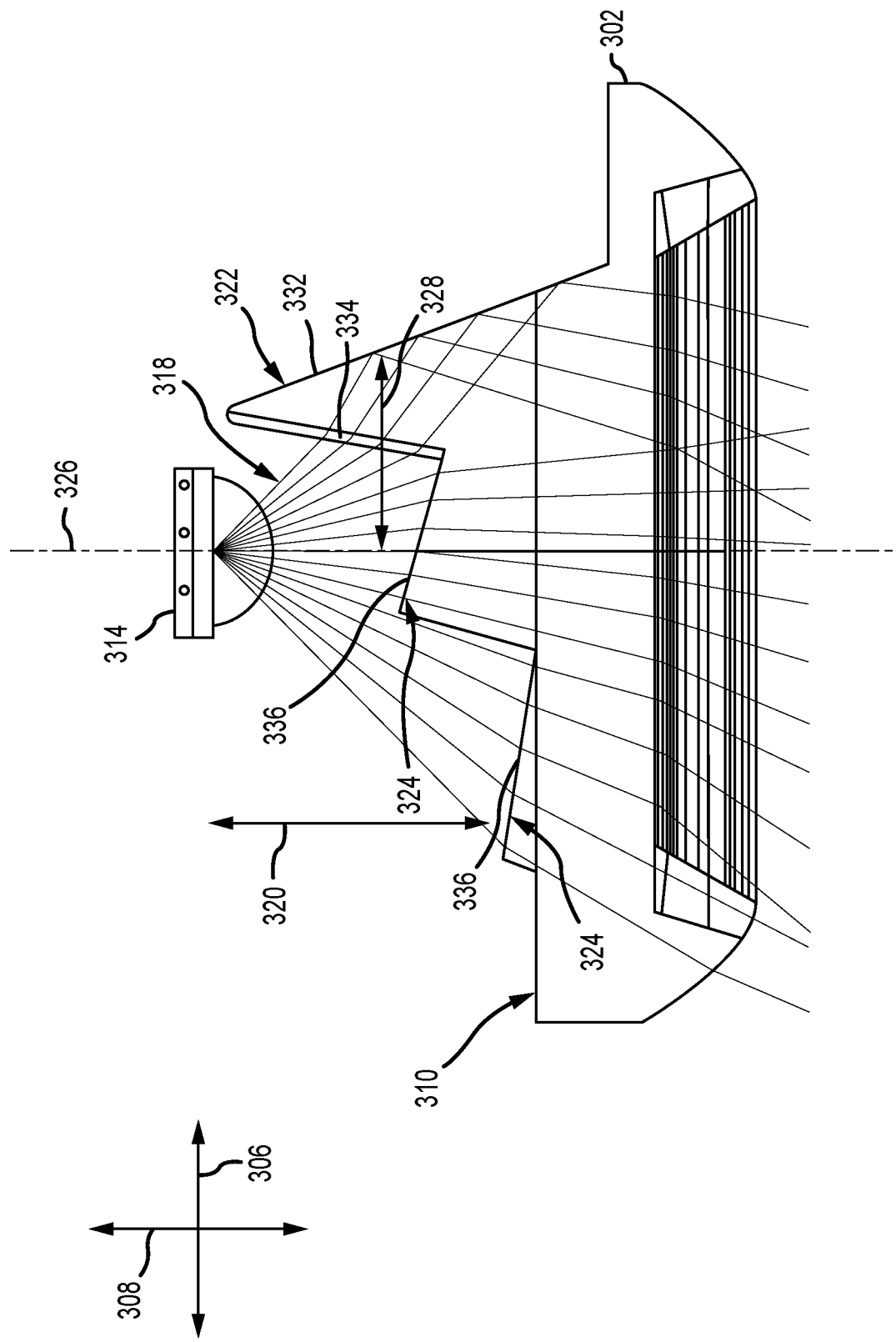
FIG. 15 is a schematic view of an optical structure of the optical distribution plate shown in FIGS. 13 and 14 illustrating light distribution along a y-axis.

FIG. 15 is a schematic view of the optical structure 302 of the optical distribution plate 300 (shown in FIGS. 13 and 14) illustrating light distribution along the y-axis 306. With continued reference to FIGS. 13 and 14 and as described above, an LED 314 may be coupled to a PCB substrate (not shown) such that light 318 is emitted in the z-axis 308 direction. The reflector plate is not illustrated for clarity in FIG. 15, but may be disposed between the optical distribution plate 300 and the PCB substrate. The optical structure 302 is positioned over the LED 314 such that the light 318 (schematically illustrated as light beams) is channeled therethrough. The bottom surface 310 is adjacent to, but offset from, the LED 314 and forms an air gap 320 between the LED 314 and the optical structure 302 and reduces thermal and/or radiometric power incident on the material forming the optical distribution plate 300.

The bottom surface 310 includes at least one TIR element 322 and at least one refractive element 324 that enables the optical structure 302 to capture the light 318 emitted by the LED 314 and focus (e.g., narrow) the emitted LED light 318 in a direction along the y-axis 306. A first centerline plane 326 extends substantially parallel to the x-axis 304 direction (e.g., in and out of the page) and also divides the bottom surface 310 in half. The TIR element 322 and the refractive elements 324 are positioned asymmetrically about the first centerline plane 326 with the TIR element 322 offset 328 from the centerline plane 326. The TIR element 322 also extends a greater distance toward the LED 314 than the refractive elements 324 which are in a stepped configuration relative to the TIR element 322. This stepped configuration enables the optic surface of the bottom surface 310 to form a larger air gap 320 for increased airflow and reduces incident power when compared to the conventional designs (e.g., a spherical convex lens) in the light system. In the example, the bottom surface 310 of the optical structure 302 focuses the light 318 in a y-axis 206 direction that is away from the TIR element 322 (e.g., focuses the light 318 towards one side of the centerline plane 326). The TIR element 322 and the refractive elements 324 extend substantially along the x-axis 304 direction (shown in FIG. 14). This orientation of the elements 322, 324 facilitates focusing the light 318 in the substantially orthogonal y-axis 306 direction.

With reference to FIG. 14, a second centerline plane 330 extends substantially parallel to the y-axis 306 direction and divides the bottom surface 310 in half. Each element 322, 324 may be curved relative to the second centerline plane 330 such that when looking down in the z-axis 308 direction the segments are substantially C-shaped along the x-axis 304 direction. Additionally, in the example, the orientation of each element 322, 324 (e.g., the direction of the curve relative to the second centerline plane 330) is the same for each optical structure 302 (e.g., in a direction towards the top of the page along the y-axis 306). This orientation of the optical structures 302 facilitates directing the light pattern towards one side of the y-axis 306. In another example, the optical structures 302 may have different element 322, 324 orientations. In yet another example, one or more of the elements 322, 324 may extend linearly along the x-axis 304 direction. In still another example, one or more of the elements 322, 324 may be angled along the x-axis 304 direction such that a V-shape is formed. In some examples, the curved elements may be offset from the second centerline plane 330.

Referring back to FIG. 15, the TIR element 322 is offset 328 from the first centerline plane 326. The TIR element 322 includes an oblique linear TIR surface 332 that forms an outside surface of the bottom surface 310. The TIR surface 332 reflects the light 318 substantially towards the centerline plane 326. In examples, the TIR surface 332 may be disposed at an angle between relative to a horizontal axis. The angles of TIR surface depend on the index of refraction of the material of the optical structure 302, and as such, this angle is based at least partially on the incident light ray and the material index of refraction so that TIR occurs. The TIR element 322 also includes a refractive surface 334 so that the light 318 from LED 314 can enter into the optical structure 302 and reach the TIR surface 332. The refractive surface 334 may be linear (as illustrated) or curved as required or desired. The TIR element 322 is sized and shaped so as to fit within the reflector cone of the reflector plate (shown in FIG. 2).

The refractive elements 324 are adjacent to the TIR element 322 and include one or more refractive surfaces 336. In the example, one refractive surface 336 is disposed at the first centerline plane 326 and one refractive surface 336 is offset from the first centerline plane 326. In other examples, any other number of refractive elements 324 may be used. The refractive surfaces 336 refract the light 318 to the side of the y-axis 306 that the TIR surface 332 reflects the light 318 towards. In examples, the refractive surfaces 336 may be disposed at an angle relative to a horizontal axis so as to refract the light 318 towards one side of the y-axis 306. Each refractive surface 336 may be disposed at approximately equal angles or may be disposed at different angles as required or desired. The refractive surfaces 336 may be linear (as illustrated) or curved as required or desired.

Figure 16:
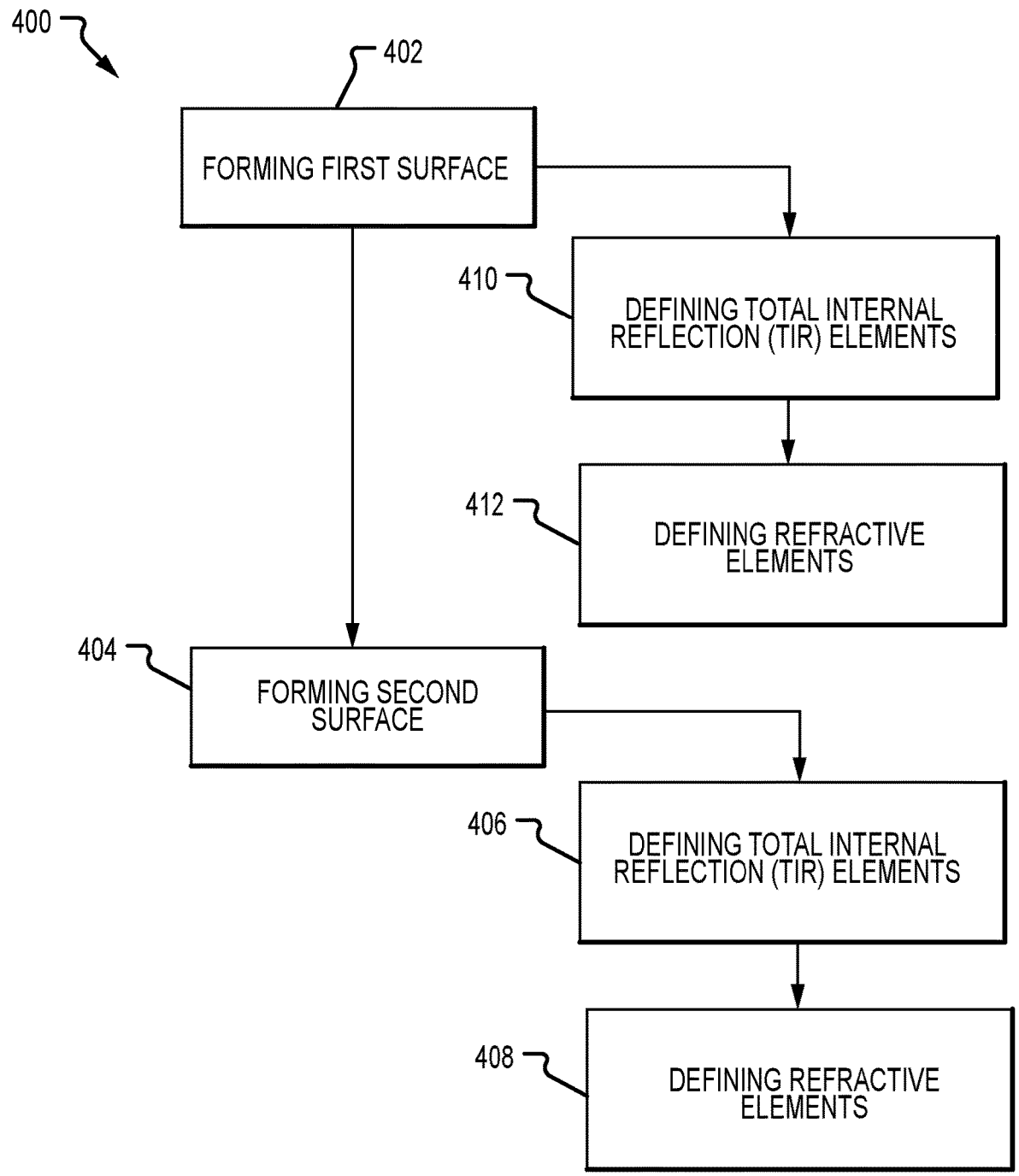
FIG. 16 is a flowchart illustrating an exemplary method of manufacturing an optical structure.

FIG. 16 is a flowchart illustrating an exemplary method 400 of manufacturing an optical structure. In the example, the method 400 includes forming a first surface of the optical structure that focuses LED light from the LED in a first orientation (operation 402). Additionally, a second opposite surface of the optical structure is formed (operation 404). The second surface distributes LED light from the LED in a second orientation, and the second orientation is substantially orthogonal to the first orientation. Forming the second surface (operation 404) may further include defining a plurality of total internal reflection (TIR) elements on the second surface (operation 406) and defining a plurality of refractive elements on the second surface (operation 408). The plurality of TIR elements and the plurality of refractive elements being arranged symmetrically about a centerline plane extending along the first orientation defined on the outer surface.

In some examples, the method 400 may further include forming the first surface (operation 402) by defining at least one TIR element on the first surface (operation 410). The at least one TIR element being offset from a centerline plane extending along the second orientation defined on the first surface. Additionally, at least one refractive element is defined on the first surface (operation 412). In some examples, the optical structures may be formed by a molding process with diamond cut tooling. In other examples, the optical structures may be formed by an additive manufacturing process (e.g., 3D printed) or any other manufacturing process now known or developed in the future. In still other examples, one or more of the surfaces of the optical structures may be formed by an extrusion process.

In the examples disclosed herein, the optical structures form the desired or required beam pattern while moving the optic surface that faces the LED further away from the LED. For example, on the inner surface of the optical structure a Fresnel element may be used or one or more total internal reflection (TIR) elements and at least one refractive elements may be used. This gap between the optical structure and the LED increases airflow around the optic surface and the LED, and reduces thermal and/or radiometric power incident on the optic surface. Thereby, increasing the performance of the light system. The optical structures described herein can also be used within existing light system housings. The inner surface also is used to narrow the LED in a first orientation. Additionally, on the outer surface of the optical structure one or more total internal reflection (TIR) elements and at least one refractive elements are used to widen the LED light in a second orientation. As such, the optical structures enable a high angle batwing pattern to be formed.

This disclosure describes some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. An optical structure for a light source comprising:
   an inner surface positionable adjacent to the light source that focuses emitted light beams in a first direction; and
   an opposite outer surface that distributes light beams emitted from the light source in a second direction, wherein the second direction is substantially orthogonal to the first direction, wherein the outer surface is symmetrical relative to the first direction and defines a centerline plane, and wherein on each side of the centerline plane of the outer surface includes:
      at least one first surface that refracts light beams in a direction away from the centerline plane; and
      a second surface connected to a third surface, wherein the second surface reflects light beams in a direction away from the centerline plane and the third surface reflects light beams in an opposite direction towards and across the centerline plane.

2. The optical structure of claim 1, wherein the second surface and the third surface are linear surfaces.

3. The optical structure of claim 1, wherein the second surface and the third surface are spaced apart from the centerline plane.

4. The optical structure of claim 1, wherein the second surface is disposed at a different oblique angle than the third surface.

5. The optical structure of claim 1, wherein the second surface and the third surface form a double total internal reflection (TIR) element, each side of the centerline plane of the outer surface further includes a single TIR element.

6. The optical structure of claim 5, wherein the at least one first surface is disposed between the double TIR element and the single TIR element.

7. The optical structure of claim 1, wherein the at least one first surface is a curved surface.

8. The optical structure of claim 1, wherein the at least one first surface includes two surfaces, the second surface and the third surface disposed between the two surfaces of the at least one first surface.

9. The optical structure of claim 1, wherein the inner surface includes a Fresnel element.

10. The optical structure of claim 9, wherein the Fresnel element includes one or more segments extending substantially along the first direction.

11. The optical structure of claim 1, wherein the inner surface is symmetrical relative to the second direction.

12. The optical structure of claim 1, wherein the inner surface is asymmetric relative to the second direction.

13. The optical structure of claim 1, wherein the centerline plane of the outer surface is a first centerline plane, the inner surface defining a second centerline plane extending along the second direction, wherein the inner surface includes a fourth surface that reflects light beams in a direction towards and across the second centerline plane.

14. The optical structure of claim 13, wherein the inner surface further includes at least one fifth surface that refracts light beams in a direction away from the fourth surface.

15. The optical structure of claim 13, wherein the fourth surface is offset from the second centerline plane.

16. An optical distribution plate for a light system comprising a plurality of optical structures of claim 1.

17. The optical distribution plate of claim 16, wherein the plurality of optical structures include at least one first optical structure and at least one second optical structure, the at least one second optical structure rotated relative to the at least one first optical structure.

18. The optical distribution plate of claim 17, wherein the at least one second optical structure is rotated 180° relative to the at least one first optical structure.

19. The optical structure of claim 1, wherein the optical structure is formed from polycarbonate.

20. A light system comprising:
    one or more light emitting diodes (LEDs) configured to emit LED light; and
    an optical distribution plate covering the one or more LEDs, the optical distribution plate including one or more optical structures each corresponding to the one or more LEDs, wherein the one or more optical structures comprise:
       an inner surface facing the corresponding LED that focuses LED light emitted from the LED in a first direction; and
       an opposite outer surface that distributes LED light emitted from the corresponding LED in a second direction, wherein the second direction is substantially orthogonal to the first direction, wherein the outer surface is symmetrical relative to the first direction and defines a centerline plane, and wherein on each side of the centerline plane of the outer surface includes:
          at least one first surface that refracts LED light in a direction away from the centerline plane; and
          a second surface connected to a third surface, wherein the second surface reflects LED light in a direction away from the centerline plane and the third surface reflects LED light in an opposite direction towards and across the centerline plane.

* * * * *